United States Patent
Takano

(10) Patent No.: US 9,898,432 B2
(45) Date of Patent: Feb. 20, 2018

(54) DATA TRANSFER CONTROL APPARATUS

(71) Applicants: KABUSHIKI KAISHA TOSHIBA, Tokyo (JP); TOSHIBA TEC KABUSHIKI KAISHA, Tokyo (JP)

(72) Inventor: Kuniyoshi Takano, Odawara Kanagawa (JP)

(73) Assignees: Kabushiki Kaisha Toshiba, Tokyo (JP); Toshiba TEC Kabushiki Kaisha, Tokyo (JP)

(*) Notice: Subject to any disclaimer, the term of this patent is extended or adjusted under 35 U.S.C. 154(b) by 464 days.

(21) Appl. No.: 14/567,287

(22) Filed: Dec. 11, 2014

(65) Prior Publication Data
US 2015/0205739 A1    Jul. 23, 2015

(30) Foreign Application Priority Data
Jan. 23, 2014  (JP) .................................. 2014-10482

(51) Int. Cl.
*G06F 13/36* (2006.01)
*G06F 13/362* (2006.01)

(52) U.S. Cl.
CPC .................................. *G06F 13/362* (2013.01)

(58) Field of Classification Search
None
See application file for complete search history.

(56) References Cited

U.S. PATENT DOCUMENTS

| 6,996,684 B2* | 2/2006 | Tseng | G06F 13/364 710/240 |
| 8,706,914 B2* | 4/2014 | Duchesneau | G06F 9/5072 709/203 |
| 2005/0002257 A1* | 1/2005 | Mizugaki | G11C 11/406 365/222 |
| 2008/0018914 A1* | 1/2008 | Doi | H04N 1/32358 358/1.1 |
| 2011/0258428 A1* | 10/2011 | Baba | G06F 1/24 713/2 |
| 2011/0320759 A1* | 12/2011 | Craddock | G06F 13/28 711/206 |

* cited by examiner

*Primary Examiner* — Michael Sun
(74) *Attorney, Agent, or Firm* — Patterson & Sheridan, LLP

(57) ABSTRACT

According to an embodiment, a data transfer control apparatus has a band measurement unit and a request mask unit. The band measurement unit measures a band level to transfer data, and compares this measurement band level with a target band level. The request mask unit outputs a correction request signal which is obtained by correcting a timing of a request signal sent from each of a plurality of processing units, based on a request mask control signal which the band measurement unit outputs.

12 Claims, 5 Drawing Sheets

DATA TRANSFER CONTROL APPARATUS

CROSS-REFERENCE TO RELATED APPLICATION

This application is based upon and claims the benefit of priority from the prior Japanese Patent Application No. 2014-10482, filed on Jan. 23, 2014, the entire contents of which are incorporated herein by reference.

FIELD

Embodiments described herein relate generally to a data transfer control apparatus having an arbitration unit.

BACKGROUND

A conventional image forming apparatus, such as a copying machine, has external devices, such as a DF (Auto Document feeder) and a print engine, so as to execute a function, such as scanning and printing. It is necessary for a copying machine to execute a plurality of data processings at a constant data transfer rate, in accordance with the processing speeds of these external devices. The copying machine has a plurality of processing blocks in order to perform these data processings. The respective processing blocks are connected to a common memory, via a plurality of channels connected to a common bus, so as to construct a flow of data. For example, when one data processing out of the above-described plurality of data processings is executed at a data transfer rate which is extremely lower than the above-described constant data transfer rate, the copying machine generates an abnormal image such as missing of an image. Accordingly, a data transfer apparatus of the copying machine monitors a transfer rate of image data in each of the above-described plurality of channels, and takes such a measure as to ensure the band by raising an access priority of a channel to the common bus, when the data transfer rate of the channel is lower than a threshold value.

In order to ensure the band by raising the access priority of a channel to the common bus as described above, the data transfer control apparatus is configured to change a priority of an arbitrator, by the difference between a rate monitoring result (measurement band) and a target rate (target band). For this configuration, the data transfer control apparatus cannot perform fine adjustment of the transfer rate between channels of a high priority, in some cases. For example, a request of a channel of a low priority is sometimes inputted between non-continuing requests of a channel of a high priority. Further, in a conventional data transfer apparatus, when a usage rate of a bus is high, it is difficult to perform a rate control which is balanced between channels. In other words, in the conventional data transfer apparatus, there is a problem such that it is difficult to perform data transfer finely and in good balance against the variation of the transfer rate.

DETAILED DESCRIPTION

Figure 1:
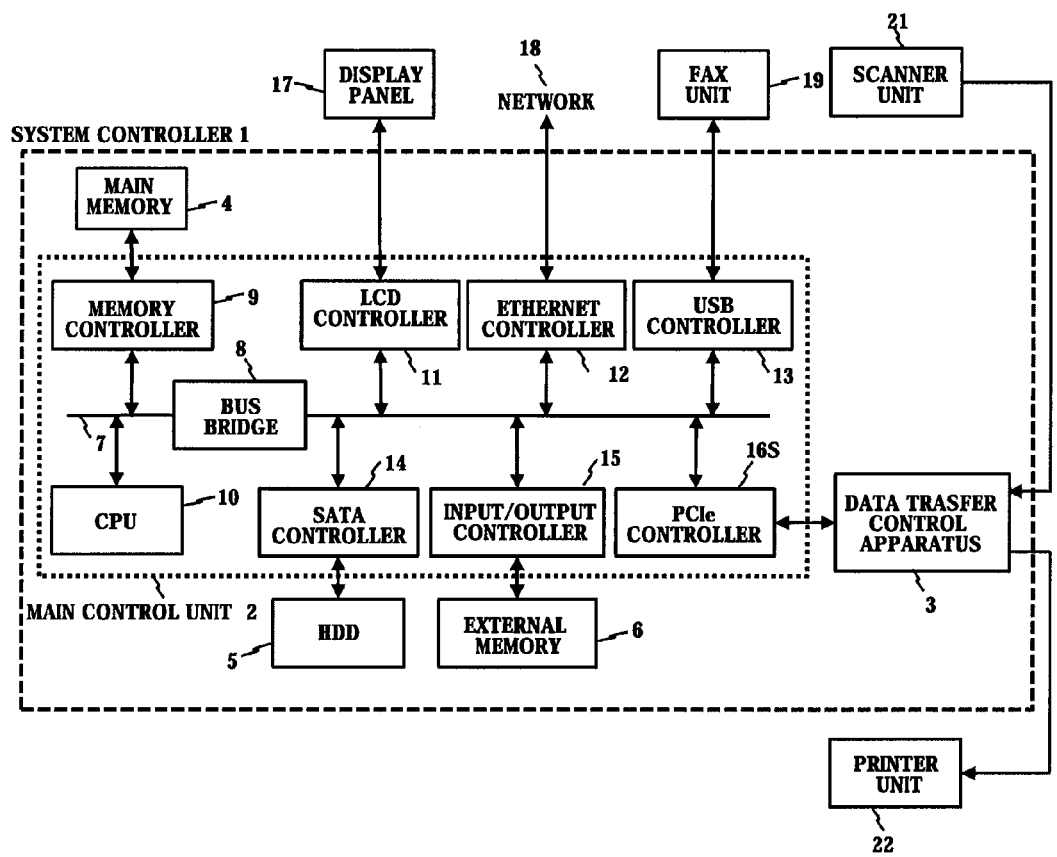
FIG. 1 is a block diagram showing a system controller including a data transfer control apparatus according to a first embodiment.

According to an embodiment, a data transfer control apparatus has an arbitration control function to a common bus. The data transfer control apparatus has a band measurement unit, a request mask unit, and a bus permission determination unit. The band measurement unit measures a band level to transfer data, and compares this measurement band level with a previously set target band level, to output a request mask control signal. The request mask unit outputs a correction request signal which is obtained by correcting a timing of a request signal sent from each of a plurality of processing units which performs a prescribed processing, based on the request mask control signal which the band measurement unit outputs. The bus permission determination unit gives a permission to access a bus so as to perform data transfer to the processing unit, based on the correction request signal outputted from this request mask unit.

Hereinafter, further embodiments will be described with reference to the drawings. In the drawings, the same symbols show the same or similar portions.

Hereinafter, a data transfer control apparatus according to a first embodiment will be described with reference to FIG. 1. FIG. 1 is a block diagram showing a system controller 1 including a data transfer control apparatus 3. The system controller 1 controls various data processings in an image forming apparatus such as a copying machine. For example, the system controller 1 processes various data, such as data and so on obtained from a scanner unit 21 of the image forming apparatus, with a given priority order. Further, the system controller 1 performs a processing such as to output this processed data to a printer unit 22 of the image forming apparatus.

As shown in FIG. 1, the system controller 1 has a main control unit 2, the data transfer control apparatus 3, a main memory 4, an HDD (Hard Disk Drive) 5, and an external memory 6. The main control unit 2 is composed of a SoC (System On Chip) including a CPU (Central Processing Unit) and a peripheral control circuit. The data transfer control apparatus 3 is composed of an ASIC (Application Specific Integrated Circuit). The external memory 6 includes a ROM (Read-Only Memory) which is only readable, and a RAM (Random-Access Memory) which is writable and readable. The external memory 6 previously stores a system program in its ROM area.

The main control unit 2 has a bus bridge 8, a memory controller 9, a CPU 10, an LCD (Liquid Crystal Display) controller 11, an Ethernet (registered trademark) controller 12, a USB (Universal Serial Bus) controller 13, a SATA (Serial Advanced Technology Attachment) controller 14, an input/output controller 15, a PCIe controller 16S, and so on. The memory controller 9, the CPU 10, the LCD controller 11, the Ethernet controller 12, the USB controller 13, the SATA controller 14, the input/output controller 15, the PCIe controller 16S, and so on connect to the bus bridge 8. The SATA controller 14 connects to the HDD 5. The input/output controller 15 connects to the external memory 6.

The SATA controller 14 is a controller based on a transfer interface standard of serial data of the HDD 5. The PCIe controller 16S is a controller based on a transfer interface standard of a serial PCI (PCI-express). The PCIe controller 16S connects to the data transfer control apparatus 3. The data transfer control apparatus 3 has a PCIe master controller 16M (refer to FIG. 2) which communicates with the PCIe controller 16S.

The LCD controller 11 connects to a display panel 17. The Ethernet controller 12 connects to a network 18. The USB controller 13 connects to a FAX unit 19.

The above-described data transfer control apparatus 3 connects to the scanner unit 21 and the printer unit 22. The data transfer control apparatus 3 inputs data of an image which is obtained by scanning a document by the scanner unit 21. The data transfer control apparatus 3 performs calculation processing of various data, in addition to the data of this image, as described later.

At the same time when a power source of the system is turned ON, the system controller 1 reads out the above-described system program from the external memory 6, and writes the system program into the main memory 4, to make the system program resident in the main memory 4. Specifically, the input/output controller 15 reads out the above-described system program from the ROM area of the external memory 6, in accordance with a Boot loader. The memory controller 9 writes the system program into the main memory via the bus bridge 8.

The CPU 10 performs control of each function, such as a display function, a network function, and a FAX function and so on, using the above-described system program. Specifically, the CPU 10 controls the LCD controller 11, the Ethernet controller 12, and the USB controller 13. The LCD controller 11 controls a display function of the display panel 17. The Ethernet controller 12 controls a communication function by the network 18. The USB controller 13 controls a communication function with the FAX unit 19.

Further, the CPU 10 controls the SATA controller 14 and the data transfer control apparatus 3. The SATA controller 14 accesses the HDD 5, and thereby performs writing of data of an image from the scanner unit 21 into the HDD 5, and reading of data of an image from the HDD 5. The data transfer control apparatus 3 performs data processing such as an image processing and data compression, to the data of the image from the scanner unit 21. The PCIe controller 16S inputs the processed data from the data transfer control apparatus 3, or outputs data of an image to be printed to the data transfer control apparatus 3. The data transfer control apparatus 3 performs data processing such as an image processing and data expansion, to the data of the image to be supplied via the PCIe controller 16S. The data transfer control apparatus 3 outputs the processed data of the image to the printer unit 22.

Figure 2:
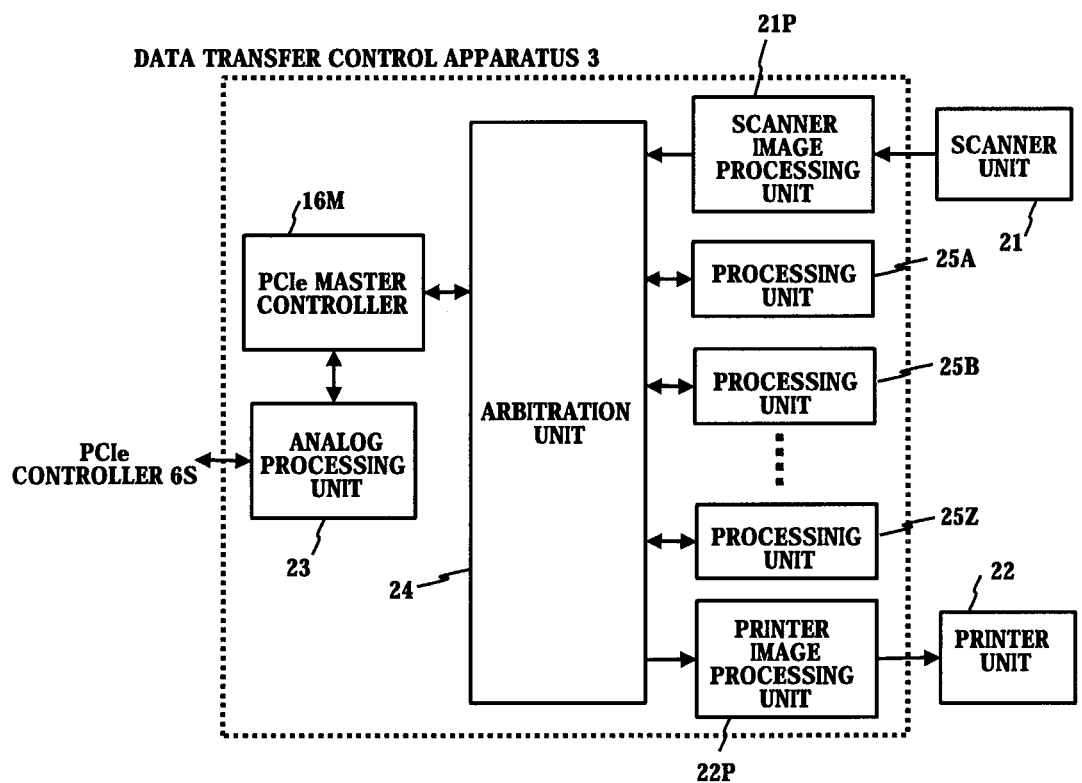
FIG. 2 is a block diagram showing the data transfer control apparatus according to the first embodiment.

Hereinafter, the data transfer control apparatus 3 will be described with reference to FIG. 2. FIG. 2 is a block diagram showing the data transfer control apparatus 3. As shown in FIG. 2, the data transfer control apparatus 3 has an analog processing unit 23, a PCIe master controller 16M, an arbitration unit 24, a scanner image processing unit 21P, a printer image processing unit 22P, and other processing unit 25A, processing unit 25B, . . . processing unit 25Z. The analog processing unit 23 connects to the PCIe controller 16S of the main processing unit 2. The PCIe master controller 16M connects to this analog processing unit 23. The arbitration unit 24 determines a priority order, when a plurality of requests are made from the processing units and so on. Each of the scanner image processing unit 21P and the printer image processing unit 22P is connected to an external device, and performs data processing including data transfer with the external device. Specifically, the scanner image processing unit 21P is connected to the scanner unit 21 that is the external device. The scanner image processing unit 21P performs a prescribed processing to image data inputted from the scanner unit 21. The printer image processing unit 22P is connected to the printer unit 22 that is the external device. The printer processing unit 22 performs a prescribed processing to image data from the arbitration unit 24, and outputs the image data which has been subjected to the prescribed processing. The processing units 25A-25Z are respectively internal processing units to perform data processing inside the data transfer control apparatus. Specifically, each of the processing units 25A-25Z performs various processings to the data and so on which are stored in the main memory 4.

The scanner image processing unit 21P performs a prescribed data processing to the image date inputted from the scanner unit 21. Further, after having performed this prescribed data processing, the scanner image processing unit 21P issues a request to perform data transfer using a common bus 7 of the main control unit 2, to the arbitration unit 24. In the following description, to perform data transfer using the common bus 7 is simply called an access to a bus sometimes. The scanner image processing unit 21P outputs a signal indicating a request for an access to a bus, as the above-described request to be issued, for example. Hereinafter, the signal indicating this request is simply called a request signal. The arbitration unit 24 confirms the state of the requests for an access to a bus from the other connected processing units. The arbitration unit 24 gives a permission to output a request for an access to a bus, to the scanner image processing unit 21P, in accordance with the confirmation result of this request state. Specifically, the arbitration unit 24 outputs a request for an access to a bus to the main control unit 2, based on a corrected request signal described later. The CPU 10 of the main control unit 2 permits an access to a bus, to this request. The scanner image processing unit 21P receives this permission to access a bus by the CPU 20, via the arbitration unit 24, as described later. When receiving the permission to access a bus by the CPU 10, the scanner image processing unit 21P transfers data to the main control unit 2 side, via the PCIe master controller 16M, the analog processing unit 23 and the PCIe controller 16S. The data transferred to the main control unit 2 side is sent to the memory controller 9, via the PCIe controller 16S, the common bus 7, and the bus bridge 8. The memory controller 9 writes this data into the main memory 4.

The data which has been written into the main memory 4 once is read out, in accordance with a request for an access to a bus from a compression circuit and so on which are implemented in the processing unit 25A and so on. The processing unit 25A performs a prescribed processing A (compression processing and so on, for example) to the above-described data to be read out. The processing unit 25A writes again the data which has been subjected to the prescribed processing A into the main memory 4. At the time of reading and writing the above-described data, the processing unit 25A outputs request signals for an access to a bus to the arbitration unit 24. When having received the permission to access a bus by the CPU 10, via the arbitration unit 24, the processing unit 25A performs an access to a bus for reading and writing data to the main memory 4. Each of the other processing units 25B-25Z similarly performs processing such as calculation processing to the data mainly in the main memory 4. When having performed calculation processing of the data, each of the processing units sends a request signal for an access to a bus to the arbitration unit 24. A request mask unit (refer to FIG. 3) described later of the arbitration unit 24 corrects a timing of the above-described request signal, in accordance with a previously set target band level. The request mask unit sends this corrected request signal to a bus permission determination unit 33 (refer to FIG. 3) described later of the arbitration unit 24. The bus permission determination unit 33 makes a request for an access to a bus, to the CPU 10, based on the corrected request signal. When having received the permission to access a bus by the CPU 10 for this request, the bus permission determination unit 33 outputs a permission signal indicating that the permission to access a bus is given to the relevant processing unit. In other words, the bus permission determination unit 33 outputs the above-described permission signal, based on that it has received the permission to access a bus by the CPU 10, to give a permission to access a bus for data transfer, to the relevant processing unit. The relevant processing unit is a processing unit which has outputted the above-described request signal. The processing unit to which the permission to access a bus is given sends data to the main control unit 2 side via the PCIe master controller 16M, the analog processing unit 23 and the PCIe controller 16S.

On the other hand, when the printer unit 22 performs printing of image data, an expansion circuit and so on which are implemented in the processing unit 25Z, for example, perform reading and writing of the image data to the main memory 4. Then the printer image processing unit 22P reads out the image data from the main memory 4, and performs a desired data processing to this read out image data. The printer image processing unit 22P outputs the image data which has been subjected to the desired data processing to the printer unit 22. The printer unit 22 performs printing, based on this image data. At the time of reading and writing image data by the above-described processing unit 25Z, and also at the time of reading image data by the above-described printer image processing unit 22P, the processing unit 25Z and the printer image processing unit 22P make a request for an access to a bus, as described above. Further, when having received the permission to access a bus by the CPU 10 as described above, the processing unit 25Z and the printer image processing unit 22P perform an access to a bus, to perform reading or writing of the image data to the main memory 4.

Figure 3:
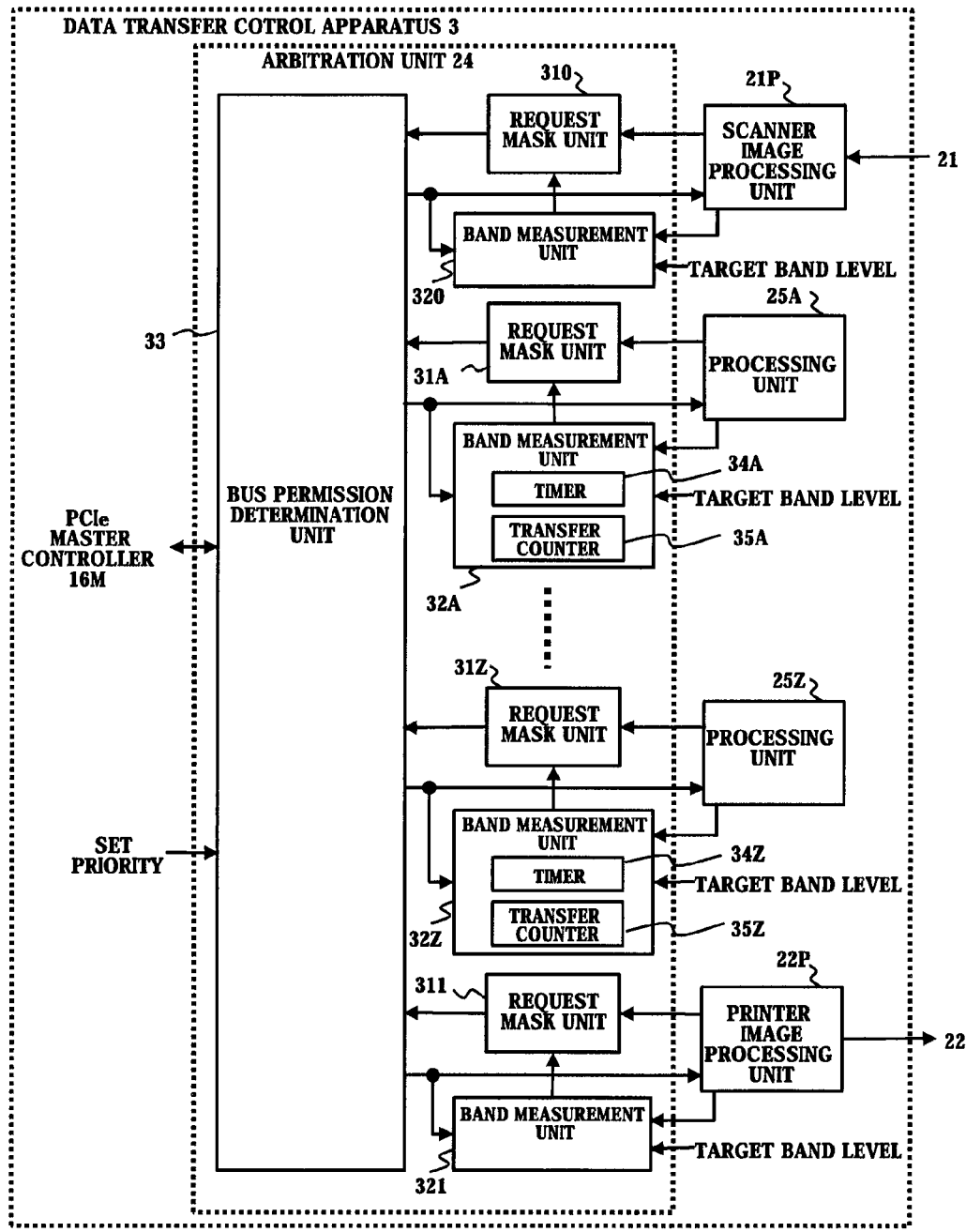
FIG. 3 is a block diagram showing mainly the arbitration unit of the data transfer control apparatus according to the first embodiment.

Hereinafter, a configuration example of the data transfer control apparatus 3 with the arbitration unit 24 as its center, with reference to FIG. 3. FIG. 3 is a block diagram mainly showing a configuration of the arbitration unit 24 of the data transfer control apparatus 3. As shown in FIG. 3, the arbitration unit 24 has request mask units 31A-31Z, 310, 311, band measurement units 32A-32Z, 320, 321, and the bus permission determination unit 33. The request mask units 31A-31Z and the band measurement units 32A-32Z are respectively provided corresponding to the processing units 25A-25Z. In FIG. 3, the request mask unit and the band measurement unit corresponding to the processing unit 25A are shown as 31A and 32A, for example. The request mask units and the band measurement units respectively corresponding to other processing units 25B-25Z are similarly shown in the drawing. Further, the request mask unit 310 and the band measurement unit 320 are provided corresponding to the scanner image processing unit 21P. The request mask unit 311 and the band measurement unit 321 are provided corresponding to the printer image processing unit 22P. In other words, the arbitration unit 24 has the request mask units 310, 311, 31A-31Z and the band measurement units 320, 321, 32A-32Z corresponding to the processing units 21P, 22P, 25A-25Z, respectively.

More specifically, the processing units 21P, 22P, 25A-25Z, and the band measurement units 320, 321, 32A-32Z are respectively connected. The band measurement units 32A-32Z have timers 34A-34Z and transfer counters 35A-35Z, respectively. Though the illustration is omitted in FIG. 3, each of the band measurement units 320, 321 has a timer and a transfer counter similarly as the above-described band measurement units 32A-32Z.

The scanner image processing unit 21P is connected to the scanner unit 21 that is the external device. The printer image processing unit 22P is connected to the printer unit 22 that is the external device. The scanner image processing unit 21P and the printer image processing unit 22P are set so as to have a higher priority order compared with the processing unit 25A and so on.

For example, the processing unit 25A sends the above-described request signal to the request mask unit 31A. The request mask unit 31A corrects a timing of the request signal, in accordance with a band level measured by the band measurement unit 32A. The request mask unit 31A sends the corrected request signal to the bus permission determination unit 33.

For example, the band measurement unit 32A has the timer 34A and the transfer counter 35A, as described above. The band measurement unit 32A measures a time from a falling edge of the request signal sent from the processing unit 25A to a next falling edge of the request signal, using the timer 34A and the transfer counter 35A. The band measurement unit 32A outputs a request mask control signal (refer to FIG. 4) to the request mask unit 31A, based on this measurement result. In the following description, the request mask control signal is simply called a mask signal sometimes.

That an interval between the above-described falling times of the request signals becomes longer means that a band level to transfer data has become low. When the above-described interval between the falling times becomes longer, the band measurement unit 32A advances a time point when the mask signal changes from an ON state to an OFF state, to raise the band level. In other words, the band measurement unit 32A shortens a time (a mask time) when the mask signal is in an ON state, when the above-described interval between the falling times becomes longer.

Figure 4:
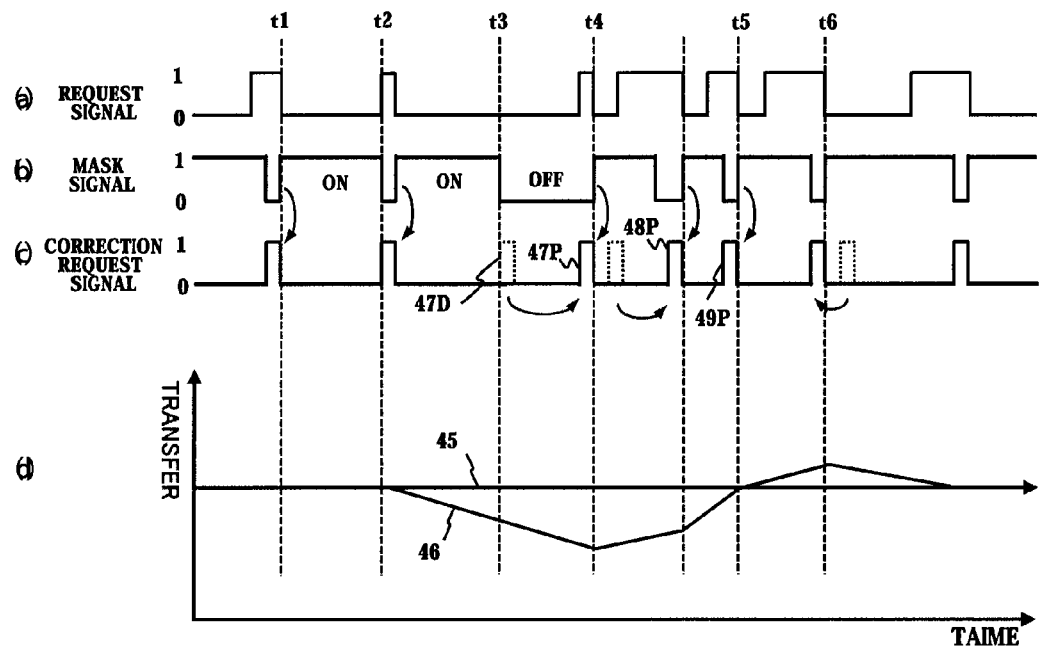
FIG. 4 is a timing chart for explaining an operation of the data transfer control apparatus according to the first embodiment.

Hereinafter, the relation between the request signal corrected based on the mask signal and the band level, for the request signal from the processing unit will be described with reference to FIG. 4. In the following description, the corrected request signal is simply called a correction request signal sometimes. FIG. 4 is a timing chart for explaining an operation of the data transfer control apparatus. In the following description, a processing to the request signal from the processing unit 25A will be described as an example. But, the following description is not limited to the processing to the request signal from the processing unit 25A.

In FIG. 4, (a) shows the request signal which the processing unit 25A sends to the arbitration unit 24, for example. (b) shows the mask signal which the band measurement unit 32A sends to the request mask unit 31A. (c) shows the correction request signal which the request mask unit 31A sends to the bus permission determination unit 33. Further, in FIG. 4, (d) shows a transfer rate at each time point. A straight line 45 in (d) shows a target band level. A polygonal line 46 in (d) shows the band level which is measured by the band measurement unit 32A.

In FIG. 4, the request signal shown in (a) is outputted by the processing unit 25A, when the processing unit 25A performs data transfer. The time when data transfer is performed is a time when the processing unit 25A performs reading and writing of data to the memory 4. There are various processings which are performed in the processing unit 25A, and the processing times thereof vary. Accordingly, the processing unit 25A irregularly outputs the request signals.

In FIG. 4, the request mask unit 31A of the arbitration unit 24 accepts the request signal at a time t1, for example. The request signal is accepted by the request mask unit 31A at the time t1, and changes from 1 (ON state) to 0 (OFF state). When the request signal changes from 1 (ON state) to 0 (OFF state) at the time t1, the band measurement unit 32A of the arbitration unit 24 makes the mask signal change from 0 (OFF state) to 1 (ON state). At the time point when the mask signal has changed from 0 (OFF state) to 1 (ON state), a transfer reference flag not shown becomes 1, and the correction request signal changes from 1 (ON) to 0 (OFF).

When the transfer reference flag becomes 1, the transfer counter 35A of the band measurement unit 32A starts counting pulses with a prescribed frequency. At a time t2 when the prescribed counting by the transfer counter 35A is finished, the band measurement unit 32A makes the mask signal change from 1 (ON state) to 0 (OFF state). Further, the request mask unit 31A and the band measurement unit 32A of the arbitration unit 24 waits till the next request signal arrives (the request signal becomes 1).

When the above-described mask signal changes from 1 (ON state) to 0 (OFF state), if the request signal is already 1 (ON state), the request mask unit 31A and the band measurement unit 32A of the arbitration unit 24 perform the same processing as at the above-described time t1. But, when the request signal does not arrive, in other words, when the request single is 0 (OFF state) (time t3), the band measurement unit 32A keeps the state that the mask signal has been changed from 1 (ON state) to 0 (Off state). The arbitration unit 24 waits that the request signal will arrive, in the state that the mask signal has been made 0 (OFF state). After that, when the request signal arrives, in other words, when the request signal becomes 1 (ON state), at a time t4, the request signal is accepted by the request mask unit 31A, and the request signal changes from 1 (ON state) to (OFF state).

Accordingly, at the time t4, the band measurement unit 32A makes the mask signal change from 0 (OFF state) to 1 (ON state). When the mask signal changes from 0 (OFF state) to 1 (ON state), the request mask unit 31A generates a correction pulse 47P that is the correction request signal. The correction pulse 47P is generated later than a normal pulse 47D in the normal case shown by a dotted line in FIG. 4. The above-described normal case is a case in which the measurement band level 46 is the target band level 45. When a timing to generate the correction pulse 47P becomes later in this manner, the band level 46 measured by the band measurement unit 32A decreases, as shown (d) in FIG. 4. Hereinafter, the band level 46 to be measured by the band measurement unit 32A is simply called the measurement band level 46.

As described above, when the measurement band level 46 becomes lower, the band measurement unit 32A sends the mask signal to the request mask unit 31A. The band measurement unit 32A sends the mask signal, to make an ON time of the next mask signal shorter. When the ON time of the mask signal becomes short, a generation timing of a next correction pulse 48P that is a correction request signal generated by the request mask unit 31A becomes earlier than usual. When the generation timing of the correction pulse 48P becomes earlier than usual, the above-described measurement band level 46 rises. The generation timing of a next correction pulse 49P also becomes earlier, and the above-described measurement band level 46 further rises.

As described above, when the generation timing of the correction pulse continues to become earlier, the above-described measurement level 46 rises. On the other hand, when the measurement band level 46 becomes higher than the target band level 45, the band measurement unit 32A makes the ON time of the mask signal longer. When the ON time of the mask signal becomes longer, the generation timing of the correction pulse generated by the request mask unit 31A becomes later conversely. In other words, when the measurement band level 46 becomes higher than the target band level 45, the band measurement unit 32A makes the ON time of the mask signal longer, so as to delay the generation timing of the correction pulse. In this manner, the arbitration unit 24 adjusts the generation timing of each of the correction pulses that are the correction request signals, so that the measurement band level (transfer rate) 46 becomes equal to the target band level.

That is, when the above-described measurement band level 46 is lower than the target band level 45, the request mask unit 31A of the arbitration unit 24 makes the generation timing of the correction pulse earlier than the case in which the measurement band level 46 is the target band level 45, to correct the timing of the request signal. When the above-described measurement band level 46 is higher than the target band level 45, the request mask unit 31A of the arbitration unit 24 makes the generation timing of the correction pulse later than the case in which the measurement band level 46 is the target band level 45, to correct the timing of the request signal. In other words, the request mask unit 31A outputs the correction request signal which is obtained by correcting the timing of the above-described request signal, so that the above-described measurement band level 46 becomes equal to the target band level 45. The band measurement unit 32A measures a time from a time when the request mask unit 31A has accepted the request signal, to a time when the request mask unit 31A accepts the next request signal, using the timer 34A and the transfer counter 35A. The band measurement unit 32A measures the above-described band level by this time measurement. When this measurement time becomes longer than a prescribed time, the band measurement unit 32A shortens a time (mask time) when the mask signal is in an ON state. The request mask unit 31A corrects the timing of the request signal, based on the mask signal in which the mask time has been shortened. The request mask unit 31A outputs the correction request signal which is obtained by correcting the timing of the request signal.

Each of the correction pulse signals that is the correction request signal is inputted from the request mask unit 31A to the bus permission determination unit 33. The bus permission determination unit 33 inputs the correction request signal, and thereby accepts the request for an access to a bus from each of the processing units. When having received the above-described request from each of the processing units, the bus permission determination unit 33 sends the request from each of the processing units to the CPU 10 of the main control unit 2 in order, according to the priority of each of the processing units and an arbitration rule. The CPU 10 permits an access to a bus to each of the above-described requests which are sent from the bus permission determination unit 33 in the above-described order. The bus permission determination unit 33 outputs a permission signal indicating that the permission to access a bus has been given, to the relevant processing unit, based on that the permission to access a bus has been given by the CPU 10. The bus permission determination unit 33 outputs the above-described permission signal, to give the permission to access a bus for data transfer to the relevant processing unit.

Generally, when requests from a plurality of the processing units are made, the processing unit having a higher priority firstly receives the above-described permission signal from the bus permission determination unit 33, and thereby can obtain the permission to access a bus. When the priorities of the respective processing units are the same level, the respective processing units equally receive the above-described permission signals, based on a round robin rule (prescribed next processing units are given priority in a sequential order), and thereby can obtain the permission to access a bus.

But, depending on the construction of each of the processing units, a request signal is always issued from each of the processing units, in some cases. Further, a request signal from a processing unit with a low priority is issued to interrupt at a good timing between request signals from a processing unit with a high priority, and thereby the processing unit with a low priority obtains a permission to access a bus, in some cases. Accordingly, in the processing units each of which should process data at a constant data transfer rate, accesses to a bus are not necessarily equally permitted in some cases.

Accordingly, the arbitration unit 24 monitors the above-described permission signal to each of the processing units and the above-described transfer reference flag. Specifically, the band measurement unit 32A of the arbitration unit 24 measures the above-described band level, by the timer 34A and the transfer counter 35A. The band measurement unit 32A sends the mask signal in accordance with the difference between the measurement band level and the target band level, to the request mask unit 31A. The request mask unit 31A corrects the timing of the request signal from the processing unit 25A, based on the mask signal. In other words, the request mask unit 31A masks the request signal from the processing unit 25A, based on the mask signal. The request mask unit 31A makes the mask signal in an ON state, to output the correction request signal which is obtained by correcting the timing of the request signal.

As described above, the data transfer control apparatus according to the first embodiment has the band measurement unit, the request mask unit and the bus permission determination unit. The band measurement unit measures the band level (transfer rate) to transfer data. Specifically, the band measurement unit measures a time from a time when the request mask unit has accepted the request (data transfer request) signal, to a time when the request mask unit accepts the next request signal, to measure the band level. Further, the band measurement unit compares the measurement band level with the target band level. For example, a case in which the above-described measurement time is longer than the prescribed time means that the above-described measurement band level is lower than the target band level. Further, a case in which the measurement time is shorter than the prescribed time means that the measurement band level is higher than the target band level. The band measurement unit varies the time (mask time) when the mask signal is in an ON state, based on the comparison result of the measurement band level and the target band level. Specifically, based on the comparison result of the measurement band level and the target band level, when the above-described measurement time is longer than the prescribed time, the band measurement unit outputs the mask signal in which the time in an ON state is shortened. In other words, the band measurement unit outputs the mask signal in which the time in an ON state is shortened, when the measurement band level is lower than the target band level. Further, based on the comparison result of the measurement band level and the target band level, when the above-described measurement time is shorter than the prescribed time, the band measurement unit outputs the mask signal in which the time in an ON state is lengthened. In other words, the band measurement unit outputs the mask signal in which the time in an ON state is lengthened, when the measurement band level is higher than the target band level. The request mask unit accepts the request signal from the processing unit. The request mask unit outputs the correction request signal which is obtained by correcting the timing of the request signal, based on the mask signal from the band measurement unit, to the bus permission determination unit 33. Specifically, when the measurement band level is higher than the target band level, the request mask unit corrects the timing of the request signal, based on the mask signal from the band measurement unit, so that the timing becomes later than the case in which the measurement band level is the target band level. Further, when the measurement band level is lower than the target band level, the request mask unit corrects the timing of the request signal, based on the mask signal from the band measurement unit, so that the timing becomes earlier than the case in which the measurement band level is the target band level. The bus permission determination unit sends the request for an access to a bus, to the CPU 10 of the main control unit, based on the correction request signal from the request mask unit. Having received the permission to access a bus by the CPU 10, the bus permission determination unit outputs the permission signal indicating that the permission to access a bus has been given by the CPU 10, to the processing unit. In other words, the bus permission determination unit outputs the above-described permission signal, to give the permission to access a bus for data transfer to the processing unit. According to the above-described first embodiment, the request signals (corrected request signals) from each of the processing units are always issued to the bus permission determination unit 33 at intervals corresponding to a desired band level. Accordingly, the data transfer control apparatus according to the first embodiment sets the target band levels for the respective processing units, and thereby can deconcentrate the local concentration of the request signals for equalization. In other words, according to the arbitration unit 24 of the data transfer control apparatus, it is possible to prevent the permission to access an unbalanced bus between the processing functions of the respective processing units, and it is possible to provide a data flow in which the band level of a common bus is shared most efficiently.

Figure 5:
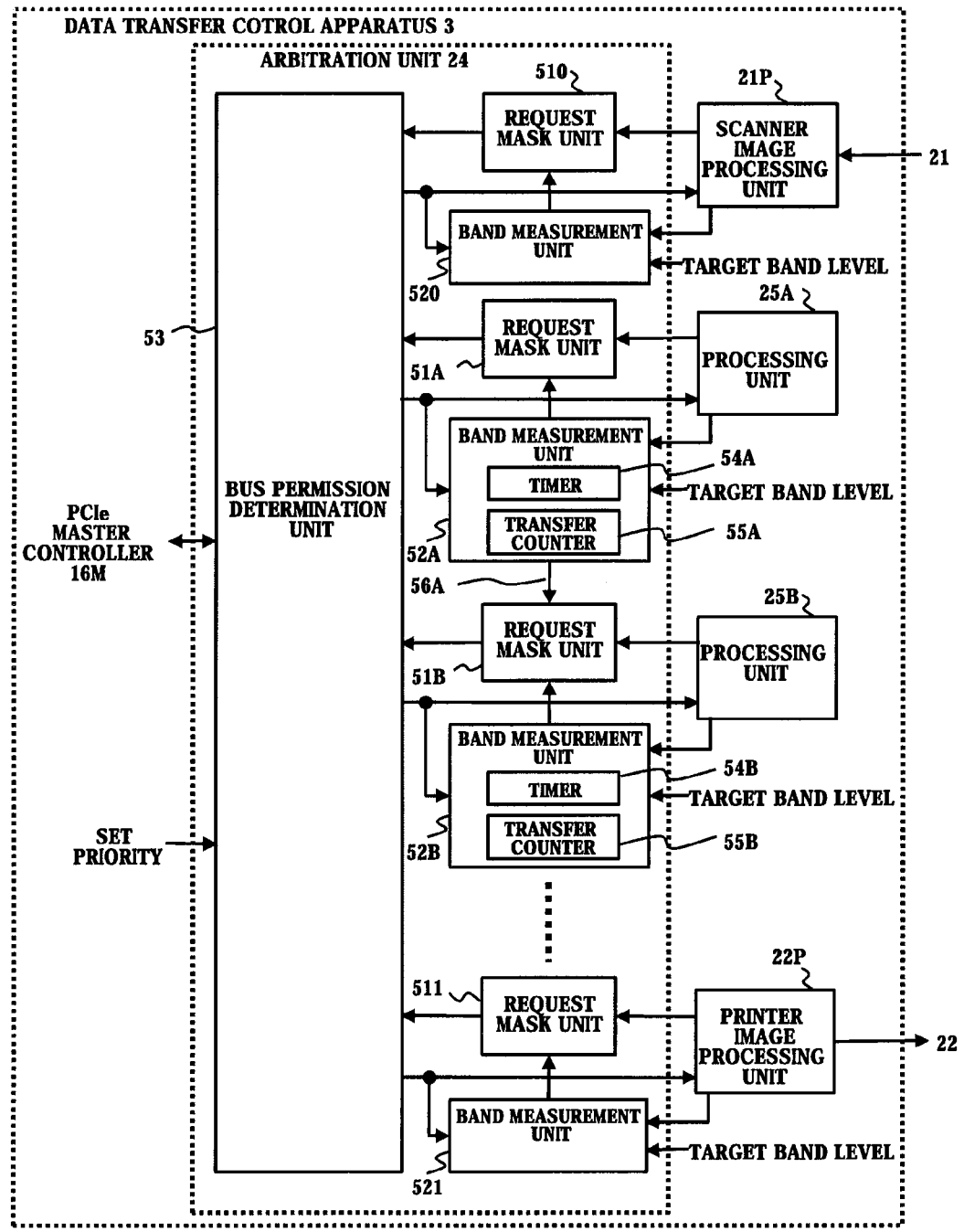
FIG. 5 is a block diagram showing a data transfer control apparatus according to a second embodiment.

Hereinafter, the arbitration unit 24 of a data transfer control apparatus according to a second embodiment will be described with reference to FIG. 5. FIG. 5 is a diagram showing a configuration example of the arbitration unit 24 according to the second embodiment. The fundamental configuration of the arbitration unit 24 according to the second embodiment is similar to the configuration of the arbitration unit according to the above-described first embodiment. But, in order to distinguish this arbitration unit 24 from the arbitration unit 24 according to the first embodiment shown in FIG. 3, reference numbers given to the respective constituent components of the arbitration unit 24 according to the second embodiment shown in FIG. 5 are changed into numbers in the 50s, and the arbitration unit 24 according to the second embodiment will be described.

As shown in FIG. 5, the arbitration unit 24 according to the second embodiment has mainly a bus permission determination unit 53, and request mask units 510, 51A, 51B . . . 511 and band measurement units 520, 52A, 52B . . . 521 which are connected to the respective processing units.

Also in the second embodiment, the request signals from the scanner image processing unit 21P and the printer image processing unit 22P which are connected to external devices are given priority.

The different point between the second embodiment shown in FIG. 5 and the first embodiment shown in FIG. 3 is a point that the band measurement unit 52A corresponding to the processing unit 25A sends a mask signal (request mask control signal) 56A to the request mask unit 51A, and in addition sends the mask signal 56A to the request mask unit 51B corresponding to the processing unit 25B.

Hereinafter, the reason why the band measurement unit 52A sends the mask signal 56A not only to the request mask unit 51A, but also to the request mask unit 51B will be described. If the request signals from the respective processing units are generated in a complicated manner, no matter how the priority orders of the respective processing units are changed, a case arises in which it is difficult to make the measurement band level equal to the target band level.

Generally, in the processing of scanning and printing, it is necessary to perform data processing at a constant data transfer rate, in accordance with an operation speed of the external device such as a DF and a printing device. Accordingly, the request mask unit 510 corresponding to the scanner image processing unit 21P, and the request mask unit 511 corresponding to the printer image processing unit 22P have to mask the request signals in accordance with the mask signals which are generated by measuring the band levels by the respective band measurement units 520, 521.

However, regarding a partial processing that the processing unit such as the processing unit 25A and the processing unit 25B reads out data from the main memory 4, and performs data processing to this read out data, and then writes back the data in the main memory 4, the priority order of this processing may be lowered, when the prescribed priority processing based on the target band level cannot be performed. For example, while the processing unit 25A performs the processing in which the band level cannot be lowered, there may be a case that the processing unit 25B is performing the processing in which the band level may be lowered, when it is difficult for the processing unit 25B to keep the band level as described above.

In the case as described above, the band measurement unit 52A sends the similar mask signal also to the request mask unit 51B, separately from the mask signal to the request mask unit 51A. The request mask unit 51B masks the request signal sent from the processing unit 25B, in accordance with the mask signal sent from the band measurement unit 52A. The request mask unit 51B masks the request signal sent from the processing unit 25B, and thereby it becomes possible to preferentially process the request signal sent from the processing unit 25A. When the band measurement unit 52A sends the mask signal to a second request mask unit other than the corresponding request mask unit 51A, it is needless to say that the second request mask unit is not limited to the adjacent request mask unit 51B.

Generally, a band measurement unit corresponding to a processing unit performing the processing in which the transfer band level cannot be lowered, may send a generated mask signal to a request mask unit corresponding to a processing unit performing the processing in which the transfer band level may be lowered.

In other words, having accepted a request signal of data processing which is required to be performed at a constant transfer rate, from the processing unit, the arbitration unit 24 adjusts a mask term for the request signal based on the measurement result of the band level, to perform the processing in which a constant data transfer rate is ensured. When the number of the processing units becomes large, and when the request signals concentrate in a specified term and the measurement band level has become lower than the lower limit setting value, the arbitration unit 24 further performs a processing to extend a mask term of the processing unit which does not require a constant data transfer rate, for a constant term.

The arbitration unit according to the second embodiment is provided with the above-described configuration, and thereby it becomes possible that the arbitration unit ensures the processing of a constant transfer rate, even when the request signals are locally concentrated.

As described above, according to the second embodiment, even when the transfer rate varies, the data transfer control apparatus capable of performing data transfer finely and in good balance can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or corrections as would fall within the scope and spirit of the inventions.

What is claimed is:

1. A data transfer control apparatus comprising:
   a band measurement unit configured to measure a data transfer rate of data transfer from at least one of a plurality of processing units to a memory connected to the processing units through a bus, compare the measured data transfer rate with a target data transfer rate, and output a mask control signal that is generated based on comparison of the measured data transfer rate and the target data transfer rate;
   a mask unit configured to mask a request signal sent from one of the plurality of processing units, based on the mask control signal output by the band measurement unit, and output the masked request signal as a modified request signal; and
   a bus permission determination unit configured to provide a permission to access the bus so as to perform data transfer from the memory to the processing unit through the bus, based on the modified request signal output by the mask unit.

2. The data transfer control apparatus according to claim 1, wherein the band measurement unit outputs the mask control signal, so that the data transfer rate measured thereby becomes equal to the target data transfer rate.

3. The data transfer control apparatus according to claim 2, wherein the band measurement unit decreases an ON period of the mask control signal during which the request signal is masked, when the data transfer rate measured thereby is lower than the target data transfer rate, so that ON timing of the modified request signal becomes earlier than ON timing of the modified request signal when the data transfer rate measured thereby is equal to the target data transfer rate.

4. The data transfer control apparatus according to claim 3, wherein the band measurement unit increases the ON period of the requested mask control signal, when the data transfer rate measured thereby is higher than the target data transfer rate, so that ON timing of the modified request signal becomes later than ON timing of the modified request signal when the data transfer rate measured thereby is equal to the target data transfer rate.

5. The data transfer control apparatus according to claim 1, wherein the band measurement unit measures a time period between two consecutive request signals sent from said one of the processing units to measure the data transfer rate.

6. A data transfer control apparatus comprising:
a plurality of processing units;
a plurality of band measurement units provided correspondingly to the plurality of processing units, respectively, each of the band measurement units being configured to measure a data transfer rate of data transfer from the corresponding processing unit through a bus, compare the measured data transfer rate with a target data transfer rate which is set for the processing unit, and output a mask control signal that is generated based on comparison of the measured data transfer rate and the target data transfer rate;
a plurality of mask units provided corresponding to the plurality of processing units, respectively, each of the mask units being configured to mask a request signal sent from corresponding one of the processing units, based on the mask control signal output by one of the band measurement units; and
a bus permission determination unit configured to provide a permission to access the bus so as to perform data transfer to each of the processing units through the bus, based on the modified request signals output from each of the plurality of mask units.

7. The data transfer control apparatus according to claim 6, wherein the processing units include a first processing unit which is connected to an external device that is external to the data transfer control apparatus and performs data transfer to the external device through the bus, and a second processing unit configured to perform data transfer from a memory connected thereto through the bus.

8. The data transfer control apparatus according to claim 6, wherein at least one of the band measurement units outputs the mask control signal to two or more of the plurality of mask units.

9. The data transfer control apparatus according to claim 6, wherein at least one of the band measurement units outputs the mask control signal, so that the data transfer rate measured thereby becomes equal to the target data transfer rate.

10. The data transfer control apparatus according to claim 6, wherein at least one of the band measurement units decreases an ON period of the mask control signal during which the request signal is masked, when the data transfer rate measured thereby is lower than the target data transfer rate, so that ON timing of the modified request signal becomes earlier than ON timing of the modified request signal when the data transfer rate measured thereby is equal to the target data transfer rate.

11. The data transfer control apparatus according to claim 10, wherein said at least one of the band measurement units increases the ON period of the requested mask control signal, when the data transfer rate measured thereby is higher than the target data transfer rate, so that ON timing of the modified request signal becomes later than ON timing of the modified request signal when the data transfer rate measured thereby is equal to the target data transfer rate.

12. The data transfer control apparatus according to claim 10, wherein said at least one of the band measurement units measures a time period between two consecutive request signals sent from corresponding one of the processing units to measure the data transfer rate.

* * * * *